US007859850B2

(12) United States Patent
Chan et al.

(10) Patent No.: US 7,859,850 B2
(45) Date of Patent: Dec. 28, 2010

(54) ELECTRONIC CARD AND EXPANSION CARD COMBINATION

(75) Inventors: Ju-Chieh Chan, Hsin Tien (TW); Ying-Chi Lien, Hsin Tien (TW); Hung-Ming Lin, Hsin Tien (TW)

(73) Assignee: D&C Technology Co., Ltd., Taipei Hsien (TW)

( * ) Notice: Subject to any disclaimer, the term of this patent is extended or adjusted under 35 U.S.C. 154(b) by 131 days.

(21) Appl. No.: 12/399,025

(22) Filed: Mar. 6, 2009

(65) Prior Publication Data
US 2010/0165588 A1 Jul. 1, 2010

(30) Foreign Application Priority Data
Dec. 26, 2008 (TW) ................................ 097223445

(51) Int. Cl.
*H05K 7/10* (2006.01)
(52) U.S. Cl. .................. 361/737; 439/945; 439/946; 439/630
(58) Field of Classification Search .............. 361/737, 361/752; 439/630, 638, 945, 946
See application file for complete search history.

(56) References Cited
U.S. PATENT DOCUMENTS 6,069,795 A * 5/2000 Klatt et al. ................. 361/737
6,075,706 A * 6/2000 Learmonth et al. ......... 361/737
6,421,246 B1 * 7/2002 Schremmer ................ 361/737
7,038,916 B2 * 5/2006 Chen ........................ 361/737
7,234,972 B1 * 6/2007 Lai ........................... 439/630
7,341,461 B1 * 3/2008 Yen et al. .................. 439/76.1
7,699,660 B2 * 4/2010 Hubert et al. .............. 439/630
2006/0243801 A1 * 11/2006 Chen ........................ 235/441

* cited by examiner

*Primary Examiner*—Dameon E Levi (57) ABSTRACT

An electronic card and expansion card combination includes an electronic card, for example, vertical insertion type Express card defining a 34 mm card accommodation space and accommodating a circuit board with an electric connector, and an expansion card, which has a flat sliding holder base movable in and out of the card accommodation space and carrying an adapter terminal set that contacts the metal contacts of the circuit board when the flat sliding holder base is extended out of the card accommodation space, and an expansion plate pivotally coupled to the flat sliding holder base and carrying a matching terminal set that contacts the adapter terminal set for the contact of metal contacts of a chip card to be inserted into a card insertion slot defined in the flat sliding holder base and the expansion plate after the expansion plate is turned to out of the flat sliding holder base.

10 Claims, 7 Drawing Sheets

ELECTRONIC CARD AND EXPANSION CARD COMBINATION

This application claims the priority benefit of Taiwan patent application number 097223445 filed on Dec. 26, 2008.

BACKGROUND OF THE INVENTION

1. Field of the Invention

The present invention relates to electronic cards and more particularly, to an electronic card and expansion card combination, which comprises an electronic card, and an expansion card, which can be received inside the electronic card or pulled out of the electronic card and then extended out for the insertion of a chip card for transmission of chip card data from the chip card to an external electronic apparatus into which the electronic card is inserted.

2. Description of the Related Art

Following fast development of high technology, people's living standard has been greatly improved, and the electronization of organization has been the host topic for many industries now. Following by the advancement of the society, there is an obvious change in purchasing behavior of the entire market. In early days, people use cash to purchase things they need. Therefore, people usually carry a big amount of money when going out and shopping. It is embarrassing at times when we are buying things and do not have enough money on hand to pay for the things we are going to buy. Nowadays, credit cards, such as Visa card, Master card, cash card, and many other different types of plastic money have been intensively used to substitute for cash. These cards are called chip cards that have embedded therein an electronic chip for storing data. For reading storage data from a chip card, a card reader shall be used. A conventional card reader for this purpose is expensive, and has a big size not convenient for carrying. Further, there is known L-shaped Express card adapter that has a 54 mm card slot for the insertion of a chip card for transferring chip card data. In actual practice, this kind of Express card adapter still has drawbacks as follows:

1. A L-shaped Express card adapter has a big size, not in conformity with requirements for modern electronic products having light, thin, short and small characteristics.

2. The unique configuration of a L-shaped Express card adapter requires much storage space, and tends to be damaged during carrying.

Therefore, it is desirable to provide a measure that eliminates the drawbacks of the use of conventional card readers and Express card adapter.

SUMMARY OF THE INVENTION

The present invention has been accomplished under the circumstances in view. It is the main object of the present invention to provide an electronic card and expansion card combination, which has an expansion card received in an electronic card can be pulled out of the electronic card and set in an extended condition for the insertion of a chip card for transmission of chip card data from the chip card to an external electronic apparatus into which the electronic card is inserted.

To achieve this and other objects of the present invention, the electronic card and expansion card combination comprises an electronic card and an expansion card received in the electronic card. The electronic card is a vertical insertion type Express card comprising a holder frame, which comprises a card accommodation space, an insertion slot located on one end of the card accommodation space and a positioning space located on the other end of the card accommodation space, a circuit board, which is mounted in the card accommodation space and comprises an electric connector located on one end thereof and set in the positioning space and electrically connectable to an external electronic apparatus and a set of metal contacts located on the other end thereof and electrically connected to the electric connector, and a metal casing, which houses the holder frame and the circuit board. The expansion card is movably set in the card accommodation space, comprising a flat sliding holder base and an expansion plate. The flat sliding holder base is received in the card accommodation space and movable in and out of the insertion slot of the electronic card, comprising a receiving space defined in the bottom side thereof, an adapter terminal set mounted in the receiving space and adapted for contacting the metal contacts of the circuit board when the flat sliding holder base is moved out of the insertion slot of the electronic card, a guide groove longitudinally extending along a first lateral side of the receiving space, and a coupling structure located on one end of a second lateral side of the receiving space. The expansion plate comprises a coupling structure pivotally coupled to the coupling structure of the flat sliding holder base for enabling the expansion plate to be turned in and out of the receiving space, an expansion space defined in the bottom side thereof for matching the receiving space to provide a chip card insertion space for the insertion of an external chip card when the expansion plate is turned out of the receiving space, a plurality of terminal slots arranged on one end thereof adjacent to the coupling structure of the expansion plate corresponding to the adapter terminal set, a matching terminal set mounted in the terminal slots and kept in contact with the adapter terminal set for the contact of metal contacts of a chip card being inserted into the chip card insertion space, and a guide groove longitudinally extending along one lateral side of the expansion space for matching with the guide groove of the flat sliding holder base for guiding insertion of an external chip card into the chip card insertion space.

Further, when the expansion card is not used, the expansion plate is turned into the inside of the receiving space of the flat sliding holder base, and then the flat sliding holder base is pushed back into the inside of the card accommodation space in the holder frame. Thus, the expansion card is received in the electronic card, saving storage space.

DETAILED DESCRIPTION OF THE PREFERRED EMBODIMENT

Figure 1:
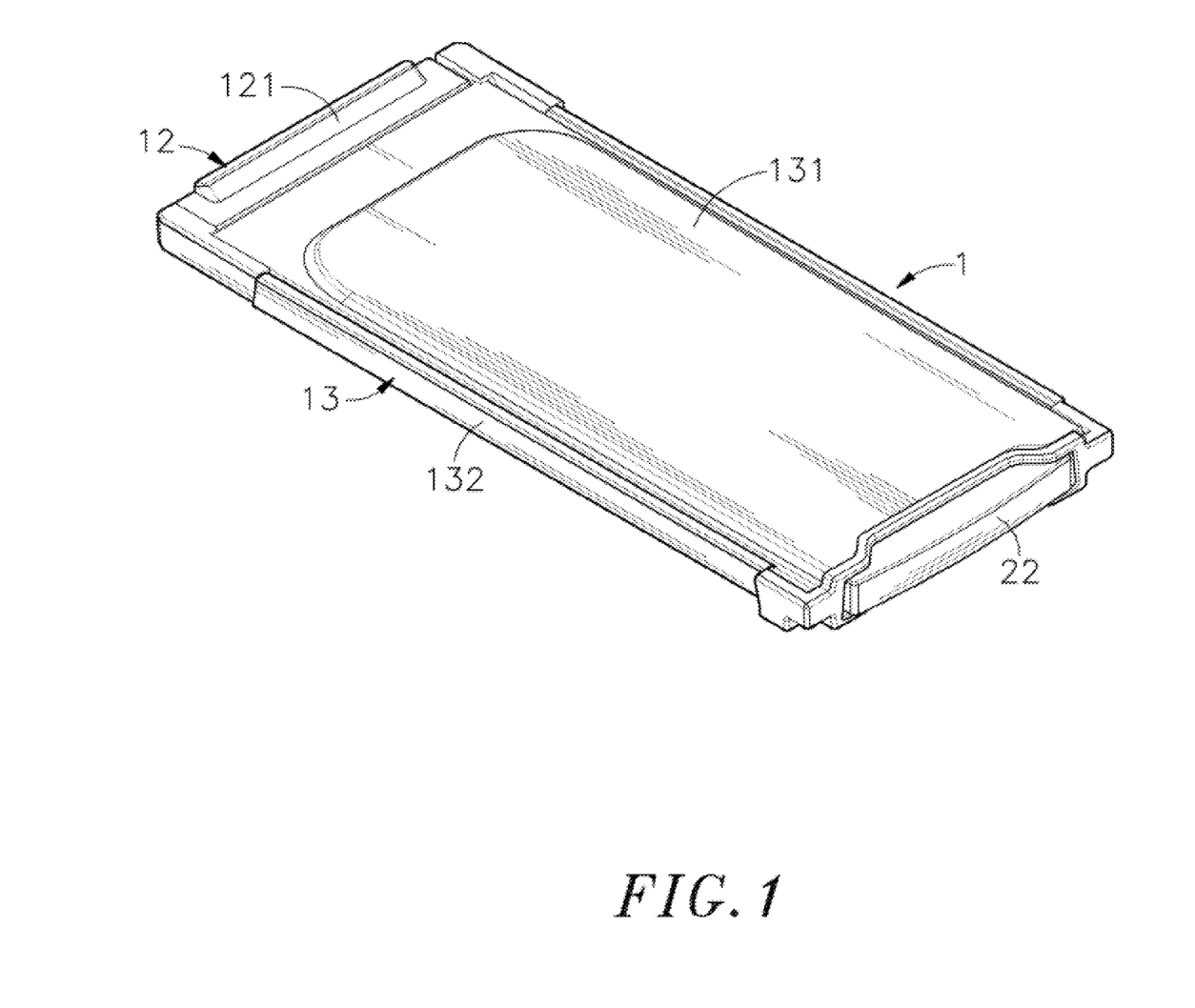
FIG. 1 is an oblique top elevational view of an electronic card and expansion card combination in accordance with the present invention.
Figure 2:
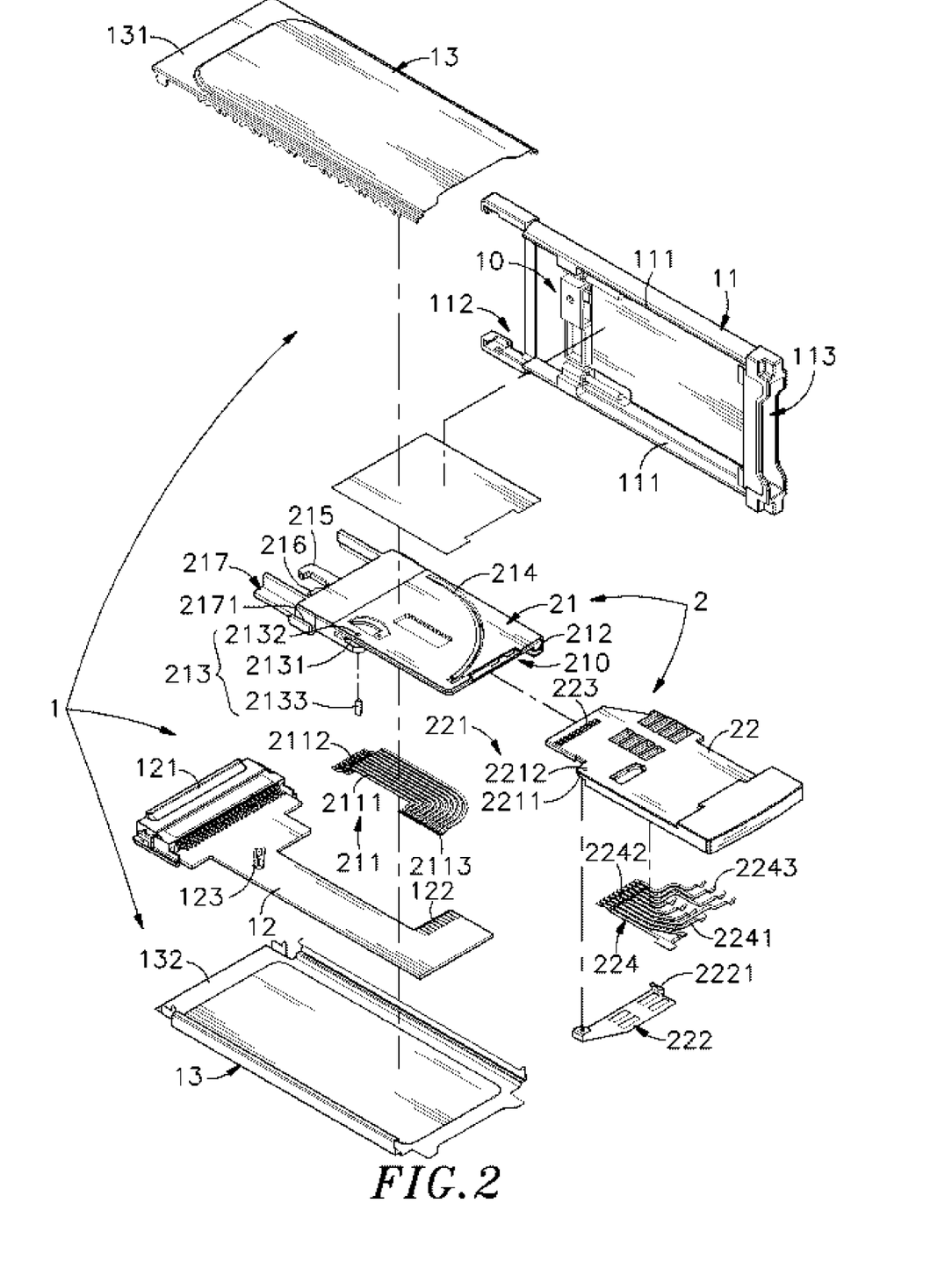
FIG. 2 is an exploded view of the electronic card and expansion card combination in accordance with the present invention.
Figure 3:
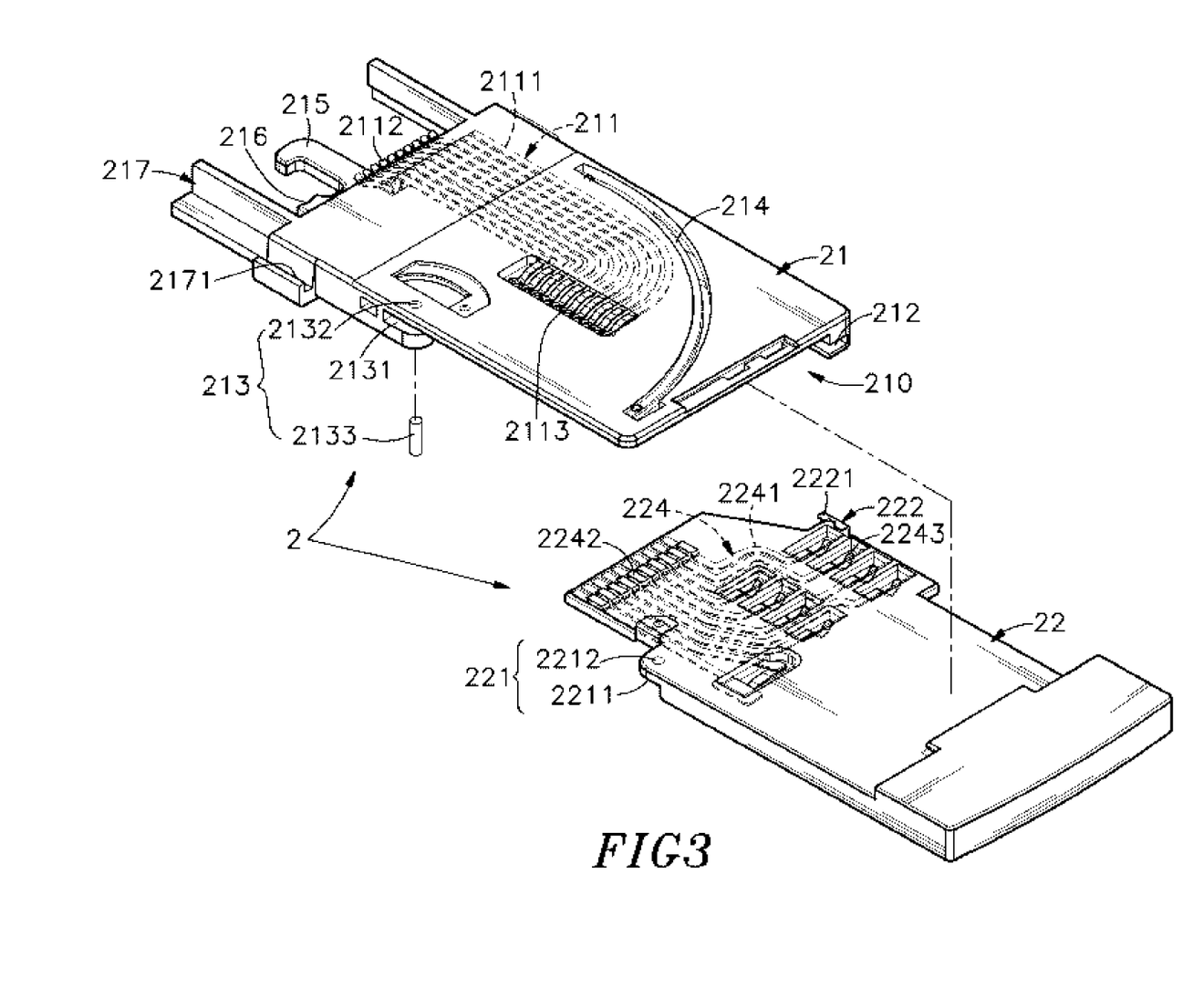
FIG. 3 is an exploded view of the expansion card of the electronic card and expansion card combination in accordance with the present invention.
Figure 4:
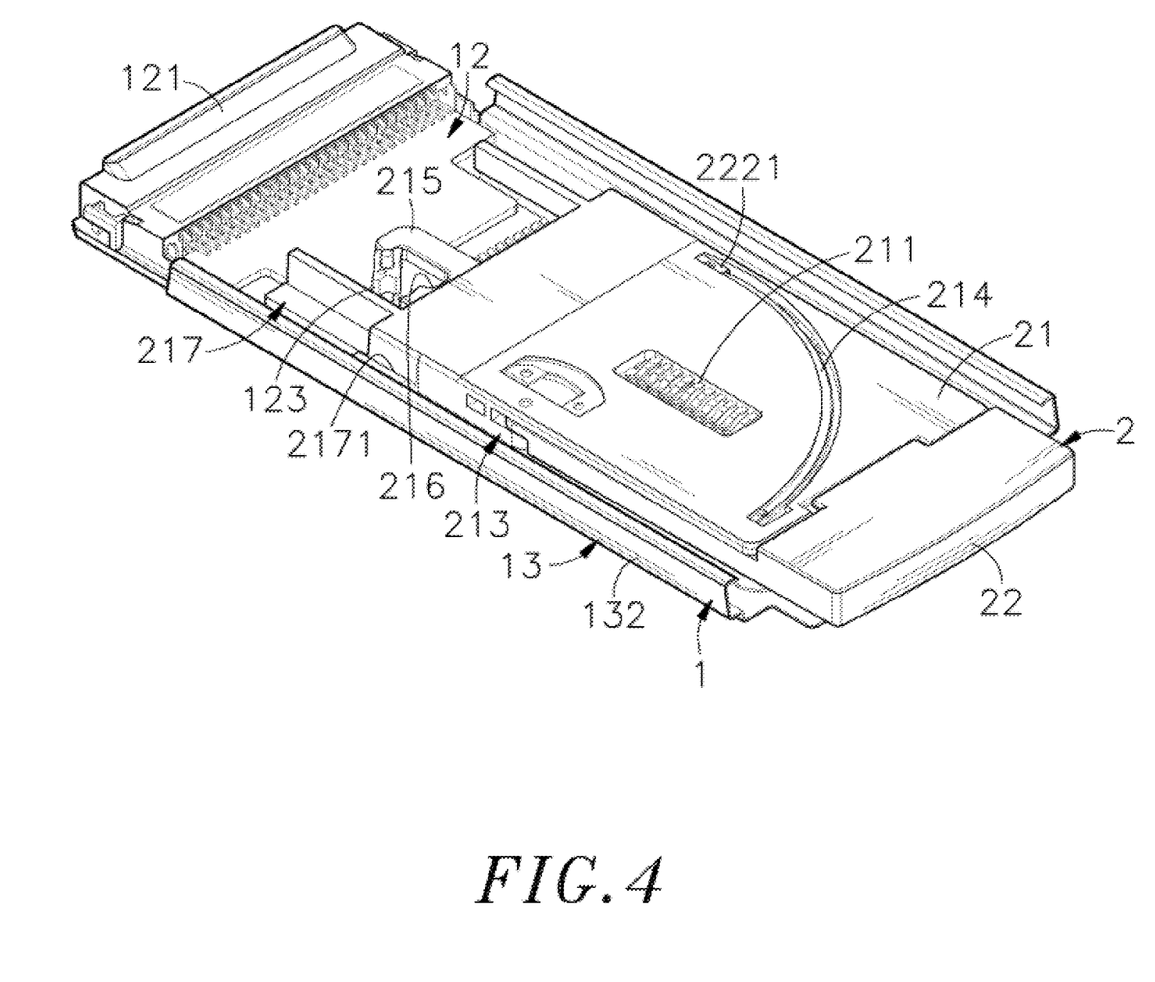
FIG. 4 is an oblique bottom elevational view of the electronic card and expansion card combination in accordance with the present invention.
Figure 5:
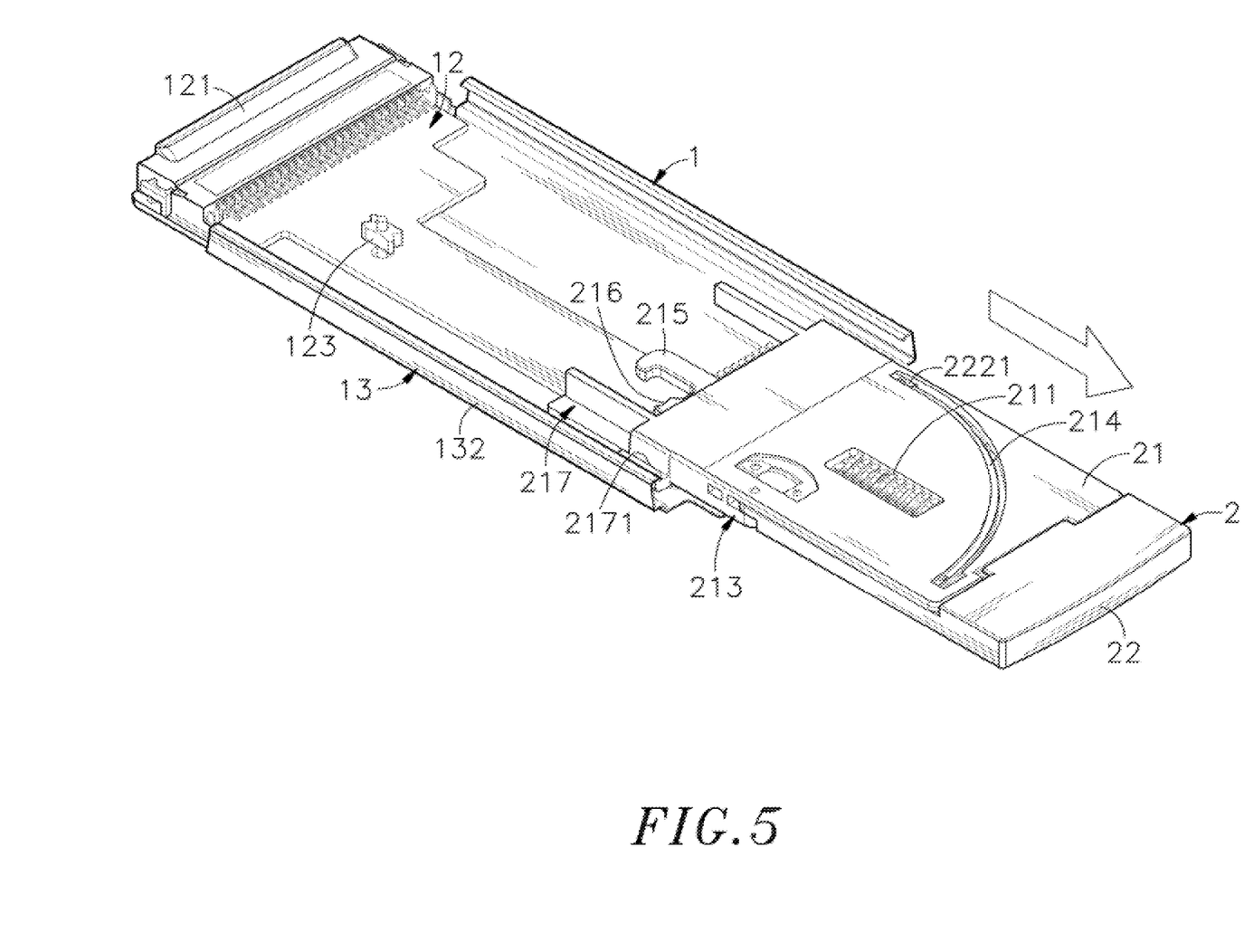
FIG. 5 is a schematic drawing of the present invention, showing the expansion card pulled out of the electronic card.
Figure 6:
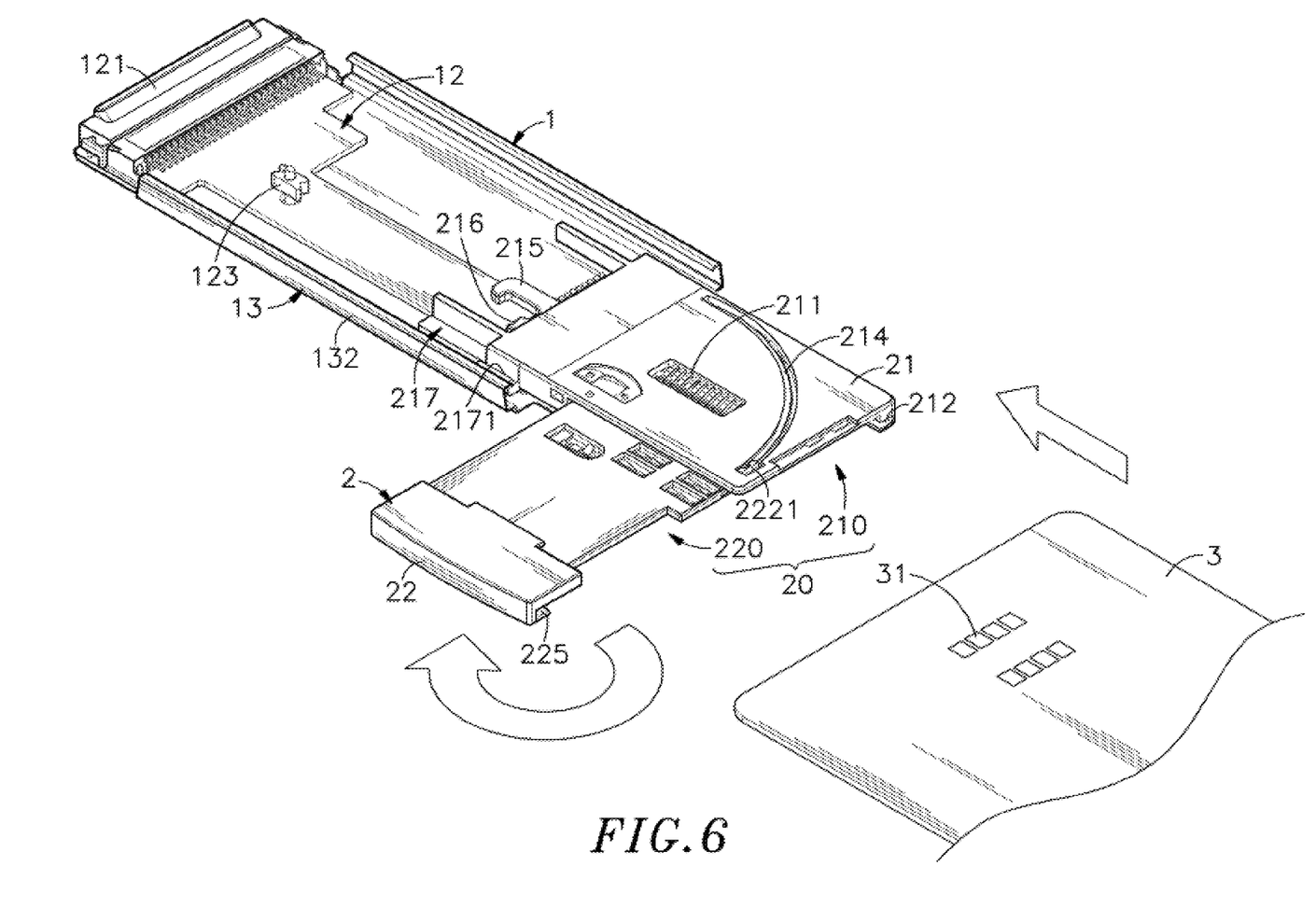
FIG. 6 is a schematic drawing of the present invention, showing the expansion card pulled out of the electronic card and the expansion plate turned out of the flat sliding holder base for the insertion of a chip card.
Figure 7:
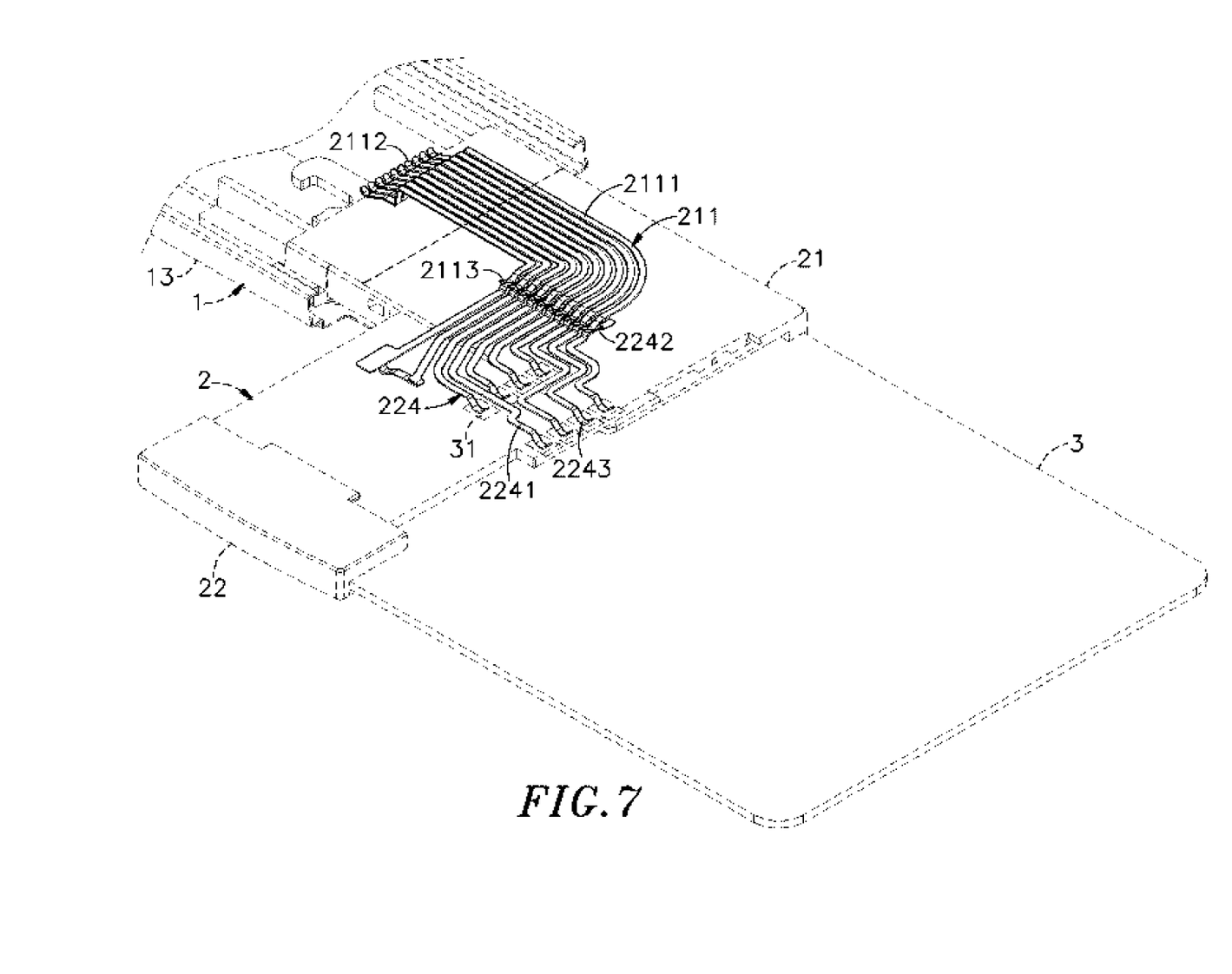
FIG. 7 is a schematic drawing of a part of the present invention, showing a chip card inserted into the card insertion slot of the expansion card.

Referring to FIGS. 1~3, an electronic card and expansion card combination in accordance with the present invention is shown comprising an electronic card 1 and an expansion card 2.

The electronic card 1 according to this embodiment is a vertical insertion type Express card, comprising a holder frame 11, a circuit board 12 mounted in the holder frame 11, and a metal casing 13 surrounding the holder frame 11. The holder frame 11 comprises two parallel tracks 111 arranged in parallel at two opposite lateral sides, a (34 mm) card accommodation space 10 defined between the two parallel tracks 111, a positioning space 112 located on one side, i.e., the front side of the card accommodation space 10, and an insertion slot 113 located on an opposite side, i.e. the rear side of the card accommodation space 10. The circuit board 12 is mounted in the card accommodation space 10, comprising an electric connector 121 located on one end thereof and set in the positioning space 112, a set of metal contacts 122 located on an opposite end thereof, and a swivel retainer 123 protruded from the top wall and disposed near the electric connector 121. The metal casing 13 comprises a top cover shell 131 and a bottom cover shell 132 respectively covered on the top and bottom sides of the holder frame 11.

The expansion card 2 comprises a flat sliding holder base 21 and an expansion plate 22. The flat sliding holder base 21 comprises an adapter terminal set 211 mounted in a receiving space 210 defined in the bottom side thereof, a guide groove 212 extending along one lateral side of the receiving space 210, a coupling structure 213 located on one end of the other lateral side of the receiving space 210, a smoothly arched sliding slot 214 cut through the top wall thereof in the receiving space 210 and extending from one end of the guide groove 212, a hook 215 and a push rod 216 protruded from one end thereof, and two limiters 217 disposed at two opposite lateral sides relative to the hook 215 and the push rod 216. Further, the adapter terminal set 211 comprises a plurality of substantially L-shaped metal terminals 2111. Each metal terminal 2111 has one end terminating in a contact portion 2112 and the other end terminating in a springy connection portion 2113. Further, each limiter 217 has a sliding rail 2171 longitudinally disposed at an outer side. Further, the coupling structure 213 comprises a coupling groove 2131, two pin holes 2132 disposed at top and bottom sides relative to the coupling groove 2131, and a pivot pin 2133 fastened to the pin holes 2132 and extending across the coupling groove 2131. The expansion plate 22 comprises a coupling structure 221 coupled to the coupling structure 213 of the flat sliding holder base 21. The coupling structure 221 comprises a protruding block 2211 protruded from one lateral side of the expansion plate 22 and inserted into the coupling groove 2131 of the coupling structure 213 of the flat sliding holder base 21, and a pivot hole 2212 cut through the protruding block 2211 and pivotally coupled to the pivot pin 2133. The expansion plate 22 further comprises a guide block 222 located on the other lateral side thereof, a guide portion 2221 protruded from the guide block 222, a plurality of terminal slots 223 cut through the top and bottom sides and transversely arranged in line on one end thereof adjacent to the coupling structure 213, a matching metal terminal set 224 installed in the terminal slots 223, an expansion space 220 defined in the bottom side, a guide groove 225 extending along the other end thereof for matching with the guide groove 212 of the flat sliding holder base 21 to guide insertion of a chip card 3 into a card insertion slot 20 that is defined by the receiving space 210 and the expansion space 220 after the flat sliding holder base 21 has been extended out of the holder frame 11 of the electronic card 1 and the expansion plate 22 has been turned out of the flat sliding holder base 21. The matching metal terminal set 224 comprises a plurality of substantially V-shaped metal terminals 2241. Each V-shaped metal terminal 2241 has one end terminating in an abutment portion 2242 mounted in and partially protruding over one terminal slot 223, and the other end terminating in a contact portion 2243.

During installation, the sliding rails 2171 of the limiters 217 of the flat sliding holder base 21 of the expansion card 2 are inserted in between the two parallel tracks 111 of the electronic card 1 into the card accommodation space 10 to force the hook 215 and the guide portion 2221 of the guide block 222 into coupling with the swivel retainer 123 of the circuit board 12 and the smoothly arched sliding slot 214 of the flat sliding holder base 21 respectively. By means of the coupling between the coupling structure 213 of the flat sliding holder base 21 and the coupling structure 221 of the expansion plate 22, the expansion plate 22 can be turned in and out of the receiving space 210 to move the guide portion 2221 of the guide block 222 between the two distal ends, namely, the inner end and outer end of the smoothly arched sliding slot 214 of the flat sliding holder base 21. By means of the aforesaid arrangement, the expansion card 2 is mounted in the card accommodation space 10 of the electronic card 1, constituting with the electronic card 1 and electronic card and expansion card combination.

Further, when the expansion plate 22 is turned out of the receiving space 210, the receiving space 210 and the expansion space 220 form the card insertion slot 20 of size about 54 mm, and the guide grooves 212 and 225 extend along two opposite lateral sides of the card insertion slot 20 in a parallel manner for guiding the insertion of the chip card 3 into the card insertion slot 20.

Referring to FIGS. 4~7 and FIG. 2 again, the expansion card 2 is received in the card accommodation space 10 of the electronic card, i.e., vertical insertion type Express card 1. When wishing to insert the chip card 3 into the electronic card and expansion card combination, push the expansion card 2 forwards toward the inside of the card accommodation space 10 to disengage the hook 215 of the flat sliding holder base 21 of the expansion card 2 from the swivel retainer 123 of the circuit board 12 and to force the push rod 216 against the swivel retainer 123, allowing the expansion card 2 to be pulled out of the insertion slot 113 of the card accommodation space 10 and avoiding hooking of the hook 215 in the swivel retainer 123 during outward movement of the expansion card 2 relative to the vertical insertion type Express card 1. At this time, the contact portions 2112 of the L-shaped metal terminals 2111 are respectively kept in contact with the respective metal contacts 122 of the circuit board 12. Thereafter, turn the expansion plate 22 out of the receiving space 210, enabling the receiving space 210 and the expansion space 220 to exhibit the card insertion slot 20 for the insertion of the chip card 3 into the card insertion slot 20. When turning the expansion plate 22 out of the receiving space 210, the abutment portions 2242 of the substantially V-shaped metal terminals 2241 are respectively moved into contact with the springy connection portions 2113 of the L-shaped metal terminals 2111. Thus, the L-shaped metal terminals 2111 of the flat sliding holder base 21, the substantially V-shaped metal terminals 2241 of the expansion plate 22 and the metal contacts 122 of the circuit board 12 are electrically connected. At this time, the chip card 3 can be inserted into the card insertion slot 20 and guided by the guide grooves 212 and 225 into the inside of the card insertion slot 20 accurately. After insertion of the chip card 3 into the card insertion slot 20, the metal contacts 31 of the chip card 3 are respectively electrically connected to the contact portions 2243 of the substantially V-shaped metal terminals 2241, allowing transmission of chip card data from the chip card 3 to an external electronic apparatus through the electric connector 121 of the circuit board 12.

After transmission of chip card data from the chip card 3 through the expansion card 2 and the vertical insertion type Express card 1 to the external electronic apparatus into which the vertical insertion type Express card 1 is inserted, remove the chip card 3 from the expansion card 2, and then turn the expansion plate 22 about the pivot pin 2133 into the inside of the receiving space 210 to move the guide portion 2221 from the outer end of the smoothly arched sliding slot 214 to the inner end thereof to have the expansion plate 22 be received inside the receiving space 210, and then push the expansion card 2 toward the inside of the card accommodation space 10 to hook the hook 215 in the swivel retainer 123 of the circuit board 12. After the expansion card 2 has been received in the electronic card (vertical insertion type Express card) 1, the size of the electronic card and expansion card combination is minimized, convenient for carrying. Further, when the electronic card (vertical insertion type Express card) 1 is inserted into a card reader of an external electronic apparatus such as a notebook computer, PDA or desk computer, it is completely received inside the external electronic apparatus, and the external electronic apparatus is kept neat.

As stated above, the electronic card and expansion card combination has the expansion card 2 received in the card accommodation space 10 (about 34 mm) of the electronic card (vertical insertion type Express card) 1, and the expansion card 2 can be pulled out of the insertion slot 113 for enabling the expansion plate 22 to be turned out of the flat sliding holder base 21 for the insertion of the chip card 3 into the card insertion slot 20 (about 54 mm) defined by the receiving space 210 and the expansion space 220.

In conclusion, the invention provides an electronic card and expansion card combination that has advantages and features as follows:

1. By means of the card accommodation space 10 (about 34 mm) of the electronic card (vertical insertion type Express card) 1 to accommodate the expansion card 2, the electronic card and expansion card combination can be set to provide the card insertion slot 20 (about 54 mm) for receiving a chip card 3 for transmission of chip card data from the chip card 3 to an external electronic apparatus. When not in use, the expansion card 2 is received in the card accommodation space 10 (about 34 mm) of the electronic card (vertical insertion type Express card) 1, thus the electronic card and expansion card combination can be completely received in an electronic apparatus after insertion of the electronic card (vertical insertion type Express card) 1 into a card reader of the electronic apparatus. Therefore, the electronic card and expansion card combination has light, thin, short and small characteristics.

2. By means of the straight configuration of the electronic card (vertical insertion type Express card) 1, the electronic card and expansion card combination is convenient for storage and carrying, avoiding impact or friction by an external body.

3. By means of receiving the expansion card 2 in the electronic card (vertical insertion type Express card) 1, the electronic card (vertical insertion type Express card) 1 can be expanded to provide the card insertion slot 20 for receiving the chip card 3 for allowing transmission of chip card data from the chip card 3 to an external electronic apparatus through the electronic card (vertical insertion type Express card) 1 without any extra chip card reader. Because the chip card 3 is electrically connected to the external electronic apparatus through the electronic card (vertical insertion type Express card) 1, the installation of the chip card 3 does not occupy any other connection port of the external electronic apparatus so that the other connection port(s) of the external electronic apparatus can be left for other applications.

A prototype of electronic card and expansion card combination has been constructed with the features of FIGS. 1~7. The electronic card and expansion card combination functions smoothly to provide all of the features disclosed earlier.

Although a particular embodiment of the invention has been described in detail for purposes of illustration, various modifications and enhancements may be made without departing from the spirit and scope of the invention. Accordingly, the invention is not to be limited except as by the appended claims What the invention claimed is:

1. An electronic card and expansion card combination, comprising:

an electronic card being an Express card, said electronic card comprising a holder frame, said holder frame comprising a card accommodation space, an insertion slot located on one end of said card accommodation space and a positioning space located on an opposite end of said card accommodation space, a circuit board mounted in said card accommodation space, said circuit board comprising an electric connector located on one end thereof and set in said positioning space and electrically connectable to an external electronic apparatus and a set of metal contacts located on an opposite end thereof and electrically connected to said electric connector, and a metal casing housing said holder frame and said circuit board; and an expansion card movably set in said card accommodation space, said expansion card comprising a flat sliding holder base and an expansion plate, said flat sliding holder base being received in said card accommodation space and movable in and out of said insertion slot of said electronic card, said flat sliding holder base comprising a receiving space defined in a bottom side thereof, an adapter terminal set mounted in said receiving space and adapted for contacting the metal contacts of said circuit board when said flat sliding holder base is moved out of said insertion slot of said electronic card, a guide groove longitudinally extending along a first lateral side of said receiving space, and a coupling structure located on one end of a second lateral side of said receiving space, said expansion plate comprising a coupling structure pivotally coupled to the coupling structure of said flat sliding holder base for enabling said expansion plate to be turned in and out of said receiving space, an expansion space defined in a bottom side thereof, said expansion space forming with said receiving space a chip card insertion space for the insertion of an external chip card when said expansion plate is turned out of said receiving space, a plurality of terminal slots arranged on one end thereof adjacent to the coupling structure of said expansion plate corresponding to said adapter terminal set, a matching terminal set mounted in said terminal slots and kept in contact with said adapter terminal set for the contact of metal contacts of a chip card being inserted into said chip card insertion space, and a guide groove longitudinally extending along one lateral side of said expansion space to match with the guide groove of said flat sliding holder base for guiding insertion of an external chip card into said chip card insertion space.

2. The electronic card and expansion card combination as claimed in claim 1, wherein said metal casing comprises a top metal cover shell and a bottom metal cover shell respectively covered on to and bottom sides of said holder frame and fixedly fastened together.

3. The electronic card and expansion card combination as claimed in claim 1, wherein said circuit board further comprises a swivel retainer suspending in said card accommodation space of said holder frame; said flat sliding holder base further comprises a rear hook adapted for hooking said swivel retainer, and a rear push rod adapted for pushing said swivel retainer away from said hook.

4. The electronic card and expansion card combination as claimed in claim 3, wherein said holder frame of said electronic card further comprises two tracks arranged in parallel at two opposite lateral sides thereof; said flat sliding holder base further comprises two limiters disposed at two opposite sides relative to said hook and said push rod, and two sliding rails respectively extended from said limiters and respectively coupled to said tracks to guide movement of said flat sliding holder base along said tracks in and out of said insertion slot of said electronic card.

5. The electronic card and expansion card combination as claimed in claim 1, wherein said flat sliding holder base further comprises a smoothly arched sliding slot cut through top and bottom sides thereof and extending from one end of the guide groove of said flat sliding holder base toward an opposite end of the second lateral side of said flat sliding holder base in communication with said receiving space for guiding movement of said expansion plate in and out of said receiving space of said flat sliding holder base.

6. The electronic card and expansion card combination as claimed in claim 5, wherein said expansion plate further comprises a guide block having a guide portion slidably coupled to the smoothly arched sliding slot of said flat sliding holder base for guiding movement of said expansion plate in and out of said receiving space of said flat sliding holder base.

7. The electronic card and expansion card combination as claimed in claim 1, wherein the coupling structure of said expansion plate comprises a protruding block, and a pivot hole cut through said protruding block; the coupling structure of said flat sliding holder base comprises a coupling groove, which receives the protruding block of the coupling structure of said expansion plate, two pin holes disposed at top and bottom sides relative to said coupling groove, and a pivot pin inserted through said pivot hole and fastened to said pin holes to pivotally secure said expansion plate to said flat sliding holder base.

8. The electronic card and expansion card combination as claimed in claim 1, wherein said adapter terminal set comprises a plurality of substantially L-shaped metal terminals arranged in parallel, each said L-shaped metal terminal comprising a contact portion located on one end thereof and adapted for contacting one of the metal contacts of said circuit board and a springy connection portion located on an opposite end thereof.

9. The electronic card and expansion card combination as claimed in claim 1, wherein said matching terminal set comprises a plurality of substantially V-shaped metal terminals, each said V-shaped metal terminal comprising an abutment portion located on one end thereof for contacting said adapter terminal set and a contact portion located on an opposite end thereof for the contact of one respective metal contact of an external chip card.

10. An electronic card and expansion card combination, comprising:

an electronic card being an Express card, said electronic card comprising a holder frame, said holder frame comprising a card accommodation space, an insertion slot located on one end of said card accommodation space and a positioning space located on an opposite end of said card accommodation space, a circuit board mounted in said card accommodation space, said circuit board comprising an electric connector located on one end thereof and set in said positioning space and electrically connectable to an external electronic apparatus and a set of metal contacts located on an opposite end thereof and electrically connected to said electric connector, and a metal casing housing said holder frame and said circuit board; and an expansion card movably set in said card accommodation space, said expansion card comprising a flat sliding holder base and an expansion plate, said flat sliding holder base being received in said card accommodation space and movable in and out of said insertion slot of said electronic card, said flat sliding holder base comprising a receiving space defined in a bottom side thereof, an adapter terminal set mounted in said receiving space and adapted for contacting the metal contacts of said circuit board when said flat sliding holder base is moved out of said insertion slot of said electronic card, a guide groove longitudinally extending along one lateral side of said receiving space, and a coupling structure, said expansion plate comprising a coupling structure coupled to the coupling structure of said flat sliding holder base for enabling said expansion plate to be slidably moved in and out of said receiving space, an expansion space defined in a bottom side thereof, said expansion space forming with said receiving space a chip card insertion space for the insertion of an external chip card when said expansion plate is moved out of said receiving space, a plurality of terminal slots arranged on one end thereof adjacent to the coupling structure of said expansion plate corresponding to said adapter terminal set, a matching terminal set mounted in said terminal slots and kept in contact with said adapter terminal set for the contact of metal contacts of a chip card being inserted into said chip card insertion space, and a guide groove longitudinally extending along one lateral side of said expansion space to match with the guide groove of said flat sliding holder base for guiding insertion of an external chip card into said chip card insertion space.

* * * * *